Inventors:
Manfred Hemmerling
Jürgen Howaldt
by Michael J. Striker
Attorney

Inventors:
Manfred Hemmerling
Jürgen Howaldt
by Michael J. Striker
Attorney

Inventors:
Manfred Hemmerling
Jürgen Howaldt
by Michael J. Striker
Attorney

United States Patent Office 3,427,398

Patented Feb. 11, 1969

3,427,398

METHOD AND SYSTEM OF ELECTRONIC EDITING OF VIDEO RECORDINGS ON MAGNETIC TAPE

Manfred Hemmerling and Jürgen Howaldt, Delmemhorst, Germany, assignors to Fernseh G.m.b.H., Darmstadt, Germany Filed Sept. 30, 1965, Ser. No. 491,728

Claims priority, application Germany, Oct. 6, 1964, R 38,931

U.S. Cl. 178—6.6 9 Claims

Int. Cl. H04n 5/76

ABSTRACT OF THE DISCLOSURE

Program portions from a first and second tape recorder are transferred consecutively to a third tape. The cue track on the first tape contains a start and a splicing signal at the end of the recorded program portion, such start signal preceding said splicing signal by the length of time required for the motor of the second tape recorder to come up to operating speed. The third tape recorder receives first the signals from the first tape recorder. The motor of the second tape recorder is started upon receipt of the start signal from the first tape recorder. The third tape recorder input is switched from the first tape recorder to the second tape recorder upon receipt of the splicing signal from the first tape recorder.

The invention relates to a method and system of electronic editing of video recordings on magnetic tape.

Since the introduction of video recording on magnetic tape wherein the video signal and the sound signal are recorded simultaneously on a magnetic tape, for artistic and economical reasons one seeks to create similar editing modes as have been in existence for a long time in the photographic sound film with optical or magnetic sound. When editing such a photographic sound film, it is possible at any time to achieve the necessary synchronism between picture and sound with the help of the mechanical perforation of the film and its frames which can be made visible by a suitable device, for example an editing table, at any running speed or at standstill.

The principal difficulty of a subsequent editing of a video recording is known to consist in that the recorded picture, in contrast to the photographic film, can only be made visible at normal speed of the magnetic tape. A definite correlation between the individual pictures and the associated sound is impossible at standstill. For subsequent exact editing of a magnetic recording, therefore, the picture and the sound have to be recorded on two separate tapes, as is the case in the photographic sound film. In order to achieve picture synchronism, also in this case the pilot tone method is used. For the reproduction, the "one tape method" is again used.

The principal difficulties in editing subsequently magnetic tapes are known. Therefore, on the magnetic tape a special track, the so called cue track, was placed to be used for editing purposes. This cue track is utilized to record a brief pulse of audio frequency to mark the position on the tape where the program director intends to cut the tape. Up to now cutting of the tape has been carried out manually in the following way: First the cutting gauge has to be adjusted to the respective head assembly which recorded the signals on the tape. Note has to be taken that the exact adjustment of the head assembly is achieved by frequent trial cuts on another tape carrying signals recorded by this head assembly.

Then the magnetic tape is removed from the tape guide and placed into the cutting gauge. Greatest care has to be taken when doing this, since even a slight damage of the tape impairs the quality of the picture by "flashes" or "starlets." Marking the cutting position by a pulse of audio frequency does not suffice for the cutting of the tape. In addition, one of the cutting pulses placed on the control track has to be made visible by a rotating head by means of an oscillograph. Only if a tacho pulse generated in the cutting device and the aforementioned cutting pulse agree absolutely, mechanical cutting of the tape can be effected. The successive tape is prepared in the same manner. These two cut tapes are now tightly joined together at their cutting edges and spliced by means of a self-adhesive foil.

Irrespective of the high technical outlay for the known cutting and splicing method each cut takes a relatively long time. In a simple case, after the adjustment of the cutting gauge, still 2 to 5 minutes are required. In more difficult cases, the time for cutting and splicing including marking may run up to 30 minutes. In addition, in the case of mechanical editing care has to be taken of the displacement of the recordings of picture and sound; therefore, it is anyhow impossible to make exact cuts in this manner. If a cut does not meet the technical or artistic requirements as desired, a correction at the cutting position of the tape is only partly possible or even impossible with the known editing method.

It is therefore an object of the invention to provide a new and improved method and system of electronic editing of video recordings on magnetic tape.

The new method and system possesses the advantage that with electronic editing picture and sound are changed over simultaneously, so that the displacement of the recordings of the video signal and the sound signal is fully maintained. There is virtually no loss in time, since if the individual takes are provided with additional start marks, these takes are alternately played back and the duration of the final program is not shortened. In addition, there is no loss in tape material, since the tapes are not cut mechanically, so that after playback they can immediately be used for other takes; the new method has the further great advantage that the splicing positions are not visible in the picture as has always been the case when cutting is effected mechanically. Finally, subsequent corrections can be made at any time. Captions, inserts, for example stationary pictures, sound effects, music, etc., can be easily introduced.

On principle, electronic editing can be carried out at any desired position of the magnetic tape, if as usual the signal to be reproduced is a blanked video signal. If editing is effected manually, it is on the contrary indispensable to maintain the synchronizing pulses for the later reproduction.

Further objects and advantages of the invention will become more apparent from the following description taken in conjunction with the figures, in which.

Figure 1:
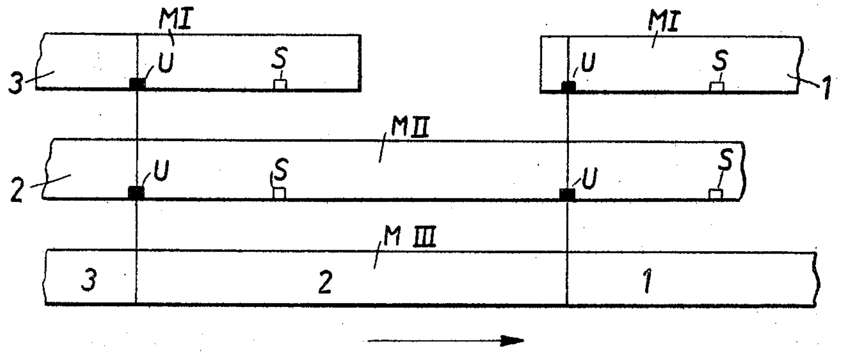
FIG. 1 shows the correlation of the individual takes with their start and splicing marks.

In FIG. 1, the three magnetic tapes M I, M II and M III show the correlation and rerecording of various takes alternately from the magnetic tapes M I and M II on to the magnetic tape M III. The direction of movement of the tape is indicated by an arrow. The beginning and the end of each take are provided with start or drive actuating marks S and splicing or switch over actuating marks U. The start marks S are situated in the direction of movement of the tape exactly 20 seconds ahead of the splicing marks or change-over marks U respectively. In the state shown first the take 1 is rerecorded from the tape M I on the tape M III. When the take 1 approaches its end, first the start mark S on the tape M I reaches the magnetic head (not shown) of the tape M I thus initiating the start of the tape M II. After 20 seconds the change-over mark U reaches the magnetic head and causes the tape M III to be changed over from the tape M I to the tape M II. Now the take 2 is rerecorded from the tape M II on the tape M III. When the take 2 on the tape M II approaches its end, the start mark S again reaches the magnetic head on the tape M II and causes the tape M I to be started again. When after 20 seconds the change-over mark U reaches the magnetic head of the tape M II, the tape M III is changed over from the tape M II to the tape M I, etc. The take 3 of the tape M I is rerecorded on the tape M III. On tape M III there are represented the individual takes rerecorded from the tapes M I and M II.

Figure 2:
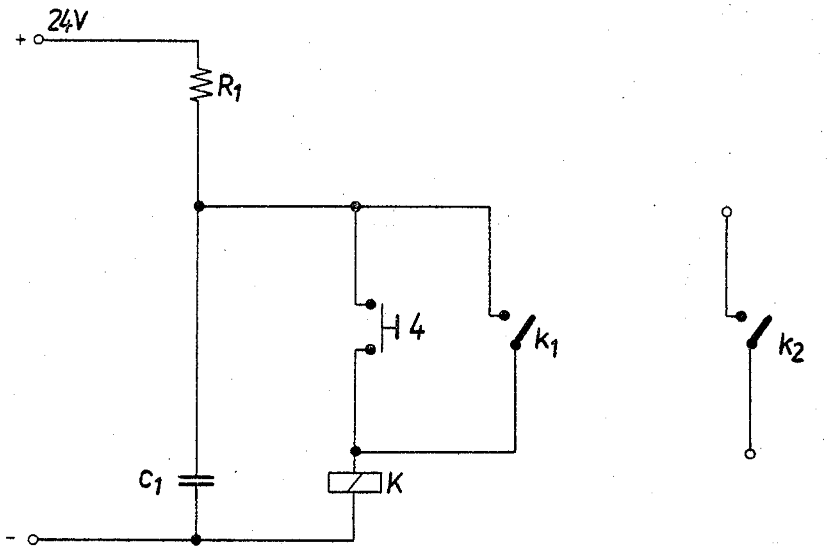
FIG. 2 is a schematic diagram of the pulse generator generating the splicing and start marks.

The circuit arrangement shown in FIG. 2 serves to ensure that the pulse necessary for marking the start and the splicing position has an exactly defined duration of 0.5 second. A tone generator of for example 300 c./s. usually existing in the magnetic tape recorder serves to supply by means of a contact pulses of audio frequency of any duration to be recorded on the cue track. On operating the contact 4 directly or by remote-control the relay K pulls up, the contact $k_1$ closes, the relay holds itself in this position by means of the contact $k_1$. Simultaneously, the contact $k_2$ which is in parallel with the contact (not shown) of the tone generator is closed. The resistor $R_1$ and the capacitor $C_1$ are so dimensioned that after a time of discharge of the capacitor $C_1$ of 0.5 second the relay K drops out; the contacts $k_1$ and $k_2$ open. In this way it is achieved that the marking pulse of audio frequency has an exactly defined duration of 0.5 second. Other time durations may be achieved by suitable choice of resistor $R_1$ and capacitor $C_1$.

Figure 3:
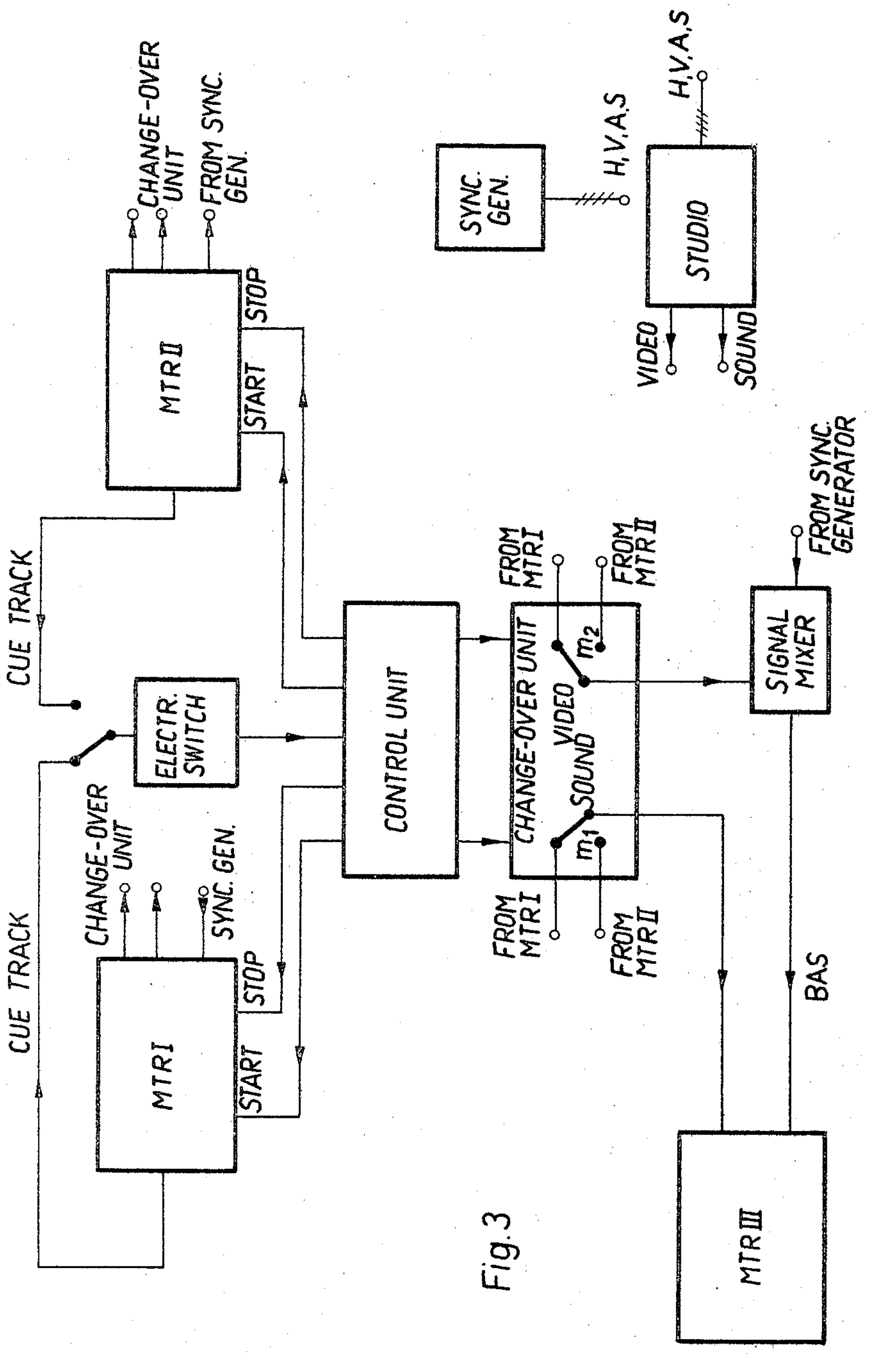
FIG. 3 is a representation of schematic block diagrams of the magnetic tape recorders and the associated control and switching arrangements.

As shown in FIG. 3 schematically, a system for embodying the new method consists, for example, of three magnetic tape recorders MTR I, MTR II and MTR III known per se as well as of a change-over unit which effects the simultaneous change-over and fading respectively of picture and sound, for example from the recorder MTR I to the recorder MTR II. The change-over unit and the recorders with the takes to be rerecorded, for example the recorders MTR I and MTR II, are controlled by the control unit which is in turn operated by pulses on the cue tracks of the magnetic tapes M I and M II by way of the electronic switch. If blanked video signals are recorded on the tapes it is necessary for the system to comprise a pulse generator to which the recorders MTR I and MTR II are locked. If a central synchronizing generator or the synchronizing generator of the studio is used, pictures arriving from the studio can be mixed with pictures taken off the recorders MTR I or MTR II by means of the change-over unit. After rerecording or fading has been carried out synchronizing signals from the pulse generator are again added by way of the signal mixer, in order that a standard composite video signal is restored which is for example recorded on the third recorder MTR III.

If several takes are to be rerecorded from the two recorders MTR I and MTR II, for the playback of the first take the recorder concerned is started manually by operating the switch for the playback mode of this recorder. After they have been started, the two recorders are switched to the position "remote control," then the mutual starting and stopping of the two recorders and the mixing of the signals is effected fully automatically, as described in detail below.

Figure 4:
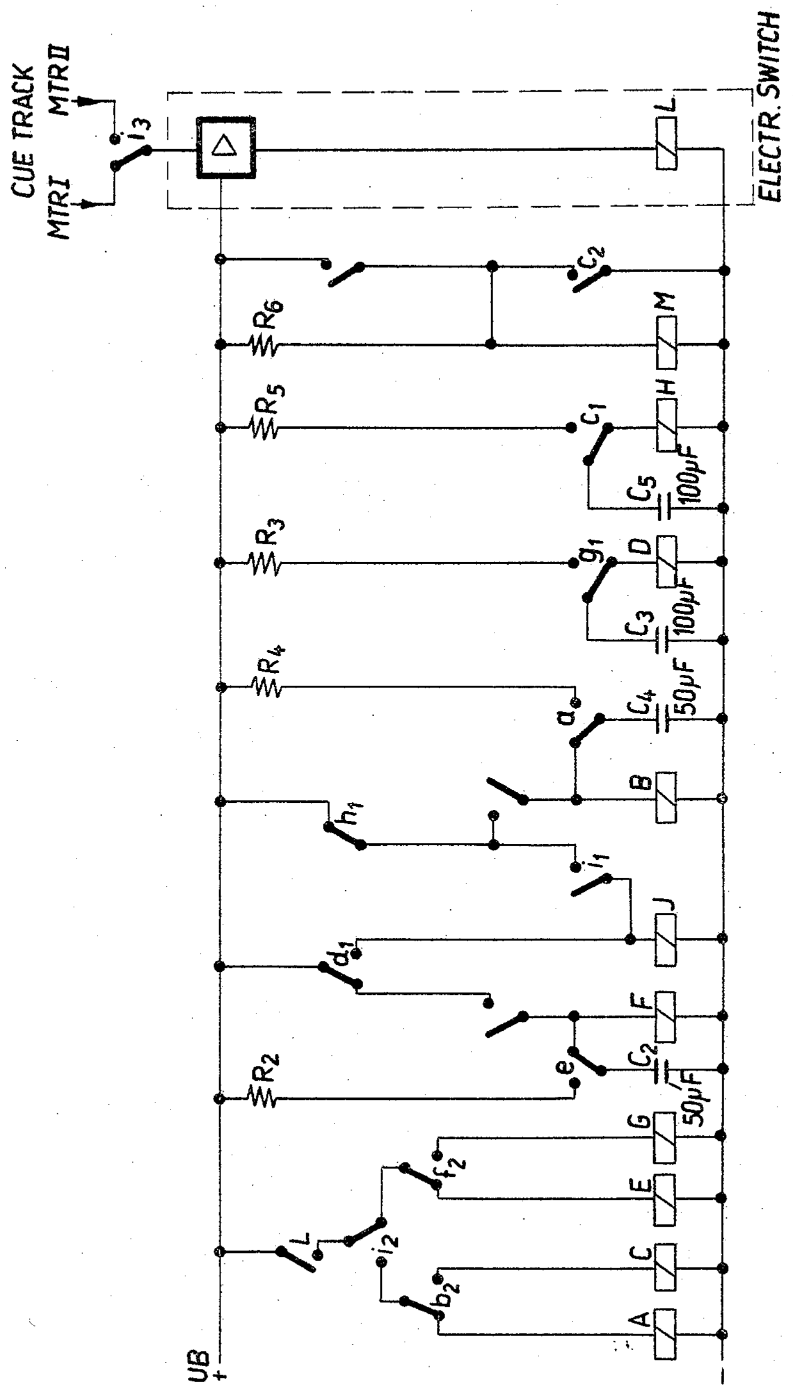
FIG. 4 is a schematic diagram of the control unit with the associated relays and relay contacts.

The contact position shown in FIG. 4 of the individual relays represents the following state of the control unit: The recorder MTR I is running, a take is rerecorded from this recorder to the recorder MTR III, the recorder MTR II is in its starting position.

The electronic switch and the control unit operate as follows: By way of the contact $i_3$ the tone signal of the marks S and U of the cue track of the recorder MTR I is selectively filtered, rectified and amplified by the arrangement designated by electronic switch in FIG. 4. If the electronic switch receives the starting signal S by way of the contact $i_3$, the relay L pulls up, the contact L connects the operating voltage $U_B$ by way of the contacts $i_2$ and $f_2$ to the relay E, the recorder MTR II is started. Simultaneously the contact $e$ connects the capacitor $C_2$ by way of the resistor $R_2$ to the operating voltage $U_B$; the capacitor $C_2$ is charged. At the end of the mark S (duration 0.5 second) the contact 1 opens and the relay E drops out; simultaneously the contact $e$ connects the capacitor $C_2$ to the relay F. The relay F pulls up, at the same time the contact $f_1$ is connected by way of the contact $d_1$ to the operating voltage $U_B$, so that the relay F is self-holding. Simultaneously the contact $F_2$ is connected to the relay G (preparing the change-over). On the appearance of the next mark U the contact 1 connects again the operating voltage $U_B$ by way of the contacts $i_2$ and $F_2$ to the relay G which in turn connects the contact $g_1$ and by this the capacitor $C_3$ by way of the resistor $R_3$ to the operating voltage $U_B$. At the same time the contact $g_2$ connects the operating voltage $U_B$ to the relay M. In the change-over unit, the contacts $m_1$ and $m_2$ (FIG. 3) switch the video signal and the sound signal of the recorder MTR I off the recorder MTR III and switch the video signal and the sound signal of the recorder MTR II on the recorder MTR III. At the end of the mark U the relay G drops out.

Simultaneously the contact $g_1$ connects the capacitor $C_3$ to the relay D. The relay D pulls up and drops out after a short time when the capacitor $C_3$ is discharged. The recorder MTR I is stopped by way of the contact $d_2$ (not shown in FIG. 4). Simultaneously the operating voltage $U_B$ is disconnected by way of the contact $g_2$ from the relay M, the relay M is self-holding by way of the resistor $R_6$ dimensioned for the holding voltage of the relay. When the relay D pulls up, the operating voltage $U_B$ is applied by way of contact $d_1$ to the relay J. Thus the relay F drops out. Simultaneously the operating voltage $U_B$ is connected to the relay J by way of the contacts $i_1$ and $h_1$. The relay J is now self-holding. At the end of the mark U the operating voltage $U_B$ is disconnected from the relay J by way of the contact $d_1$. On switching the relay J the contact $i_3$ is changed-over from the cue track of the recorder MTR I to the cue track of the recorder MTR II (see FIG. 3, input of the electronic switch). Simultaneously the contact $i_2$ is connected to the contact $b_2$ and thus to the relay A (preparing the start of recorder MTR I).

If the start signal S of the cue track of the recorder MTR II appears in the electronic switch, the contact 1 is again connected to the contact $i_2$. The operating voltage $U_B$ switches the relay A (start of the recorder MTR I). Simultaneously the capacitor $C_4$ is connected by way of the contact $a$ and the resistor $R_4$ to the operating voltage $U_B$, the capacitor $C_4$ is charged. At the end of mark S the operating voltage is switched off by way of the contacts 1, $i_2$ and $b_2$. The relay A drops out, the contact $a$ connects the capacitor $C_4$ from the operating voltage $U_B$ to the relay B. During the discharge of the capacitor $C_4$ the relay B pulls up for a short time and connects the contacts $b_1$ and $b_2$ (preparing the change-over). The relay B is self-holding by way of the contacts $b_1$ and $h_1$. The successive mark U connects by way of the electronic switch the contact 1 and thus the operating voltage $U_B$ by way of the contacts $i_2$ and $b_2$ to the relay C. The relay C pulls up, the contact $c_2$ short-circuits the relay M. The two contacts $m_1$ and $m_2$ of the change-over unit (see FIG. 3) switch again from the video signal and the sound signal of the recorder MTR II to the video signal and the sound signal of the recorder MTR I. When the relay C pulls up, the contact $c_1$ connects the capacitor $C_5$ by way of the resistor $R_5$ to the operating voltage $U_B$. The capacitor $C_5$ charges by way of the resistor $R_5$. At the end of the mark U the contact 1 switches off again the operating voltage $U_B$. The relay C drops out, the contact $c_1$ connects the capacitor $C_5$ to the relay H. The relay H pulls up for a short time during the discharge of the capacitor $C_5$. Simultaneously the contact $c_2$ removes the bridging of the relay M (relay M preparing for the later change-over to the recorder MTR II).

The contact $h_2$ (not shown in FIG. 4) of the relay H is closed for a short time and effects the stopping of the recorder MTR II. Simultaneously the operating voltage $U_B$ is disconnected from the relay J (up to now self-holding) by way of the contacts $h_1$ and $i_1$. The relay J drops out. The contact $i_1$ interrupts the connection to the contact $h_1$. Simultaneously the contact $i_2$ is switched to the contact $f_2$ and thus to the relay E (recorder MTR again preparing for starting). In addition, the contact $i_3$ switches the cue track from the recorder MTR II to the cue track of the recorder MTR I.

The process described above in conjunction with FIG. 4 is repeated automatically in continuous succession until the end of editing.

Since the change-over unit effects the change-over from one recorder to another one, the change-over unit can operate in any desired manner, for example effecting automatically a rough cut, a dissolve or a lap dissolve or any other desired mixing.

While the invention has been illustrated and described as embodied in a special arrangement, it is not intended to be limited to the details shown, since various modifications and structural changes may be made without departing in any way from the spirit of the present invention. For example the relays may be replaced by electronic switches.

What is claimed and desired to be secured by Letters Patents is:

1. A method of producing two consecutive series of first and second signal sequences by means of a first and a second signal reproducer and a signal recorder wherein said second signal reproducer has a motor, requiring, after start thereof, a predetermined time length until reaching its substantially constant reproducing speed, said method comprising, in combination, the steps of making on a magnetic signal record a first sequence of magnetic signals; making on a second magnetic signal record a second sequence of magnetic signals, said first and second sequences of magnetic signals to be re-recorded consecutively on a third magnetic signal record; forming on said first magnetic signal record a drive actuating signal and a switchover actuating signal separated in direction of movement of said first magnetic signal record by such a distance that said records pass through an activating location thereof at a time interval greater than said predetermined time length; reproducing said first magnetic signal record on said first signal reproducer; starting said second signal reproducer motor upon reproduction of said drive actuating signal; switching over at the time of reproduction of said switchover signal from reproduction of signals from said first magnetic signal record to said second magnetic signal record; and recording the thus consecutively reproduced first and second series of signals on a third magnetic signal record.

2. Arrangement for consecutively recording two series of signal sequences from two magnetic signal records, comprising, in combination, a first magnetic signal reproducer; a second magnetic signal reproducer; first drive means associated with said first magnetic signal reproducer; second drive means associated with said second magnetic signal reproducer, said second drive means requiring, after starting, a period of predetermined time length until it reaches its substantially constant reproducing speed; a first magnetic signal record associated with said first magnetic signal reproducer and containing signals adapted to be reprdouced by the same, said first magnetic signal record containing a drive actuating signal means and a switchover actuating signal means located on said magnetic signal record at such a distance from each other in direction of movement of said signal record that said drive actuating signal means and said switchover actuating signal means pass through predetermined locations at a time interval which is greater than said predetermined time length; first actuating means associated with said first magnetic signal reproducer and said second drive means for starting said second drive means when said drive actuating signal means on said first magnetic signal record passes through a predetermined location thereof in said first magnetic signal reproducer; second actuating means associated with said first and second magnetic signal reproducers for terminating reproduction by said first magnetic signal reproducer and starting reproduction by said second magnetic signal reproducer when said switchover actuating signal means on said first magnetic signal record passes through said predetermined location in said first magnetic signal reproducer; and recording means for consecutively recording signals reproduced first by said first magnetic signal reproducer and then by said second magnetic signal reproducer for consecutive recording.

3. A system according to claim 2 wherein said first and second reproducers comprise tape recorders; also comprising a synchronizing generator synchronizing said first and said second magnetic tape recorder.

4. A system according to claim 3 also comprising a signal mixer adding the synchronizing signal from said synchronizing generator to the blanked video signal played back from said first or said second magnetic tape recorder.

5. In a system according to claim 2 an alternating current generator, means for taking off bursts of alternating current of predetermined duration from said alterating current generator, said bursts being said drive actuating and switchover actuating start signals for recording on the cue track of the magnetic tape.

6. A system according to claim 5 wherein said predetermined duration for said splicing signal is about 0.5 second.

7. A system according to claim 5, wherein said predetermined duration of said drive actuating signal is somewhat greater than 0.5 second.

8. A system according ot claim 2, wherein the drive actuating signals on said magnetic tapes are placed 20 seconds ahead of the switchover actuating signals.

9. A system according to claim 2, wherein said control unit contains switching means controlled by the splicing and start signals recorded on the cue tracks of said first and second magnetic tape, said switching means effecting the start and stop of said magnetic tape recorders playing back said magnetic tapes and switching the signals played back from said first or said second magnetic tape on said third magnetic tape recorder recording the signals on said third magnetic tape.

References Cited

UNITED STATES PATENTS 3,230,307 1/1966 Bounsall.
2,558,853 7/1951 Kappeler.

ROBERT L. GRIFFIN, *Primary Examiner.*

HOWARD W. BRITTON, *Assistant Examiner.*

U.S. Cl. X.R.

179—100.2